US010902463B2

(12) United States Patent
Li et al.

(10) Patent No.: US 10,902,463 B2
(45) Date of Patent: Jan. 26, 2021

(54) ADVERTISEMENT DISPLAY METHOD, AND TERMINAL

(71) Applicant: Huawei Technologies Co., Ltd., Shenzhen (CN)

(72) Inventors: Yang Li, Nanjing (CN); Huangang Pang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/479,769

(22) PCT Filed: Jun. 7, 2017

(86) PCT No.: PCT/CN2017/087431
§ 371 (c)(1),
(2) Date: Jul. 22, 2019

(87) PCT Pub. No.: WO2018/133289
PCT Pub. Date: Jul. 26, 2018

(65) Prior Publication Data
US 2020/0175548 A1 Jun. 4, 2020

(30) Foreign Application Priority Data
Jan. 20, 2017 (CN) .......................... 2017 1 0051633

(51) Int. Cl.
G06Q 30/02 (2012.01)
H04N 21/234 (2011.01)
(Continued)

(52) U.S. Cl.
CPC ..... G06Q 30/0255 (2013.01); G06Q 30/0277 (2013.01); H04N 21/23424 (2013.01);
(Continued)

(58) Field of Classification Search
USPC ....................................................... 705/14.1
See application file for complete search history.

(56) References Cited

U.S. PATENT DOCUMENTS 8,301,125 B2\* 10/2012 Ramer .................. H04H 60/46
455/414.1
2014/0067528 A1 3/2014 Littlejohn et al.
(Continued)

FOREIGN PATENT DOCUMENTS

CN 101600164 A 12/2009
CN 101686252 A 3/2010
(Continued)

OTHER PUBLICATIONS

Foreign Communication From a Counterpart Application, European Application No. 17892832.1, Extended European Search Report dated Nov. 22, 2019, 10 pages.
(Continued)

Primary Examiner — Afaf Osman Bilal Ahmed
(74) Attorney, Agent, or Firm — Conley Rose, P.C.

(57) ABSTRACT

A method includes obtaining, by a terminal, first advertisement information of a current to-be-played advertisement and second advertisement information of a predicted future to-be-played advertisement, where the first advertisement information is used to indicate a characteristic attribute of a to-be-played advertisement currently displayed on the terminal, and the second advertisement information is used to indicate a characteristic attribute of a to-be-played advertisement to be displayed on the terminal in the future. The method further includes obtaining, by the terminal, a first advertisement creative of the current to-be-played advertisement based on the first advertisement information. The method further includes obtaining, by the terminal, a second advertisement creative of the future to-be-played advertisement based on the second advertisement information. The (Continued)

method further includes separately displaying, by the terminal, the first advertisement creative and the second advertisement creative.

20 Claims, 11 Drawing Sheets

(51) Int. Cl.
H04N 21/433 (2011.01)
H04N 21/458 (2011.01)
H04N 21/81 (2011.01)

(52) U.S. Cl.
CPC ..... H04N 21/4331 (2013.01); H04N 21/4333 (2013.01); H04N 21/458 (2013.01); H04N 21/812 (2013.01)

(56) References Cited

U.S. PATENT DOCUMENTS

| 2014/0129323 | A1 | 5/2014 | Amirbekian et al. |
| 2014/0279026 | A1 | 9/2014 | Nath et al. |
| 2015/0358689 | A1 | 12/2015 | Wen et al. |
| 2016/0063577 | A1 | 3/2016 | Yellin et al. |
| 2019/0303973 | A1 | 10/2019 | Nath et al. |

FOREIGN PATENT DOCUMENTS

| CN | 102223358 A | 10/2011 |
| CN | 102722829 A | 10/2012 |
| CN | 102724169 A | 10/2012 |
| CN | 103095840 A | 5/2013 |
| CN | 103257863 A | 8/2013 |
| CN | 103607647 A | 2/2014 |
| CN | 103647756 A | 3/2014 |
| CN | 104363483 A | 2/2015 |
| CN | 105074743 A | 11/2015 |
| CN | 105631711 A | 6/2016 |
| EP | 2727065 A1 | 5/2014 |
| KR | 20080097251 A | 11/2008 |
| WO | 2013006440 A1 | 1/2013 |

OTHER PUBLICATIONS

Machine Translation and Abstract of Chinese Publication No. CN101600164, Dec. 9, 2009, 18 pages.
Machine Translation and Abstract of Chinese Publication No. CN102223358, Oct. 19, 2011, 22 pages.
Machine Translation and Abstract of Chinese Publication No. CN102722829, Oct. 10, 2012, 28 pages.
Machine Translation and Abstract of Chinese Publication No. CN102724169, Oct. 10, 2012, 17 pages.
Machine Translation and Abstract of Chinese Publication No. CN103095840, May 8, 2013, 13 pages.
Machine Translation and Abstract of Chinese Publication No. CN103607647, Feb. 26, 2014, 16 pages.
Machine Translation and Abstract of Chinese Publication No. CN104363483, Feb. 18, 2015, 25 pages.
Machine Translation and Abstract of Korean Publication No. KR20080097251, Nov. 5, 2008, 12 pages.
Foreign Communication From a Counterpart Application, Chinese Application No. 201780003468.8, Chinese Office Action dated Jun. 26, 2019, 10 pages.
Foreign Communication From a Counterpart Application, PCT Application No. PCT/CN2017/087431, English Translation of International Search Report dated Oct. 18, 2017, 2 pages.
Foreign Communication From a Counterpart Application, PCT Application No. PCT/CN2017/087431, English Translation of Written Opinion dated Oct. 18, 2017, 3 pages.

* cited by examiner

ADVERTISEMENT DISPLAY METHOD, AND TERMINAL

CROSS-REFERENCE TO RELATED APPLICATIONS

This application is a national stage of International Application No. PCT/CN2017/087431, filed on Jun. 7, 2017, which claims priority to Chinese Patent Application No. 201710051633.9, filed on Jan. 20, 2017. Both of the aforementioned applications are hereby incorporated by reference in their entireties.

TECHNICAL FIELD

Embodiments of this application relate to the field of communications technologies, and in particular, to an advertisement display method and a terminal.

BACKGROUND

Generally, an advertiser uploads, to an advertisement resource pool, an advertisement creative (such as an advertisement image, text, video, and audio) that needs to be delivered. In a process of using an application (app), a user triggers a terminal to obtain a corresponding advertisement creative from the advertisement resource pool and display the advertisement creative on a display screen of the terminal.

When the terminal detects that the user starts an app or a specified screen of an app is displayed, it may be considered that the terminal has a request for displaying an advertisement at that time. Further, as shown in FIG. 1, the terminal may send an advertisement request to an advertisement server, and the advertisement server searches the advertisement resource pool for advertisement information of a target advertisement (such as an ID, a name, and an advertisement type of the target advertisement, and a download link of an advertisement creative of the target advertisement) matching the advertisement request, and returns the advertisement information to the terminal. The terminal may further obtain the advertisement creative of the target advertisement from the advertisement server based on the advertisement information. For example, the advertisement creative of the target advertisement is downloaded based on the download link of the advertisement creative in the advertisement information. Then, the advertisement creative of the target advertisement is displayed on the display screen of the terminal.

However, when the terminal downloads the advertisement creative, if an image, a video, or audio included in the advertisement creative is relatively large, or a network bandwidth is insufficient during download, downloading of the advertisement creative is relatively slow. Consequently, during use of the app, the user needs to spend a large amount of time waiting for downloading the advertisement creative. This reduces a promotion success rate of an advertisement, and greatly affects user experience when the user uses the app.

SUMMARY

Embodiments of this application provide an advertisement display method and a terminal, so as to reduce duration of loading an advertisement creative during running of an app, thereby increasing a promotion success rate of an advertisement and improving user experience during use of the app.

To achieve the foregoing objectives, the following technical solutions are used in the embodiments of this application:

According to a first aspect, an embodiment of this application provides an advertisement display method, including: obtaining, by a terminal, first advertisement information of a current to-be-played advertisement (where the first advertisement information is used to indicate a characteristic attribute of a to-be-played advertisement currently displayed on the terminal) and second advertisement information of a predicted future to-be-played advertisement (where the second advertisement information is used to indicate a characteristic attribute of a to-be-played advertisement to be displayed on the terminal in the future); obtaining, by the terminal, a first advertisement creative of the current to-be-played advertisement based on the first advertisement information; obtaining a second advertisement creative of the future to-be-played advertisement based on the second advertisement information; and separately displaying, by the terminal, the first advertisement creative and the second advertisement creative. In other words, when the terminal needs to display the current to-be-played advertisement on a display screen, the first advertisement information of the current to-be-played advertisement and the second advertisement information of the predicted future to-be-played advertisement that is likely to be displayed on the terminal in the future may be obtained at one time. Further, the first advertisement creative of the current to-be-played advertisement and the second advertisement creative of the future to-be-played advertisement are obtained.

In this way, when the terminal needs to display the future to-be-played advertisement at a future moment, the obtained second advertisement creative can be directly output to the display screen for displaying, thereby saving time of downloading the second advertisement creative by the terminal. Therefore, in a process of using an app, a user does not need to spend a large amount of time waiting for the terminal to download an advertisement creative, thereby increasing a promotion success rate of an advertisement and improving user experience during use of the app.

With reference to the first aspect, in a possible implementation, the obtaining, by a terminal, first advertisement information of a current to-be-played advertisement and second advertisement information of a predicted future to-be-played advertisement specifically includes: sending, by the terminal, an advertisement request for the current to-be-played advertisement to a server, where the advertisement request is used to trigger the server to determine first advertisement information corresponding to the current to-be-played advertisement, and to predict second advertisement information corresponding to the future to-be-played advertisement; and receiving, by the terminal, a response message sent by the server, where the response message includes the first advertisement information and the second advertisement information. In other words, when the terminal needs to display the current to-be-played advertisement, the terminal may also obtain advertisement information of the future to-be-played advertisement from the server. In this way, the terminal can obtain the advertisement information of the future to-be-played advertisement in advance without increasing a quantity of interactions between the terminal and the server, so that the terminal can download an advertisement creative of the future to-be-played advertisement based on the advertisement information in advance, thereby saving user waiting time that is caused by real-time downloading of an advertisement creative when an advertisement needs to be played.

With reference to the first aspect and the foregoing possible implementation, in another possible implementation, the advertisement request includes at least one of application information of an application currently running on the terminal, device information of the terminal, and user behavior data recorded by the terminal. Therefore, the server predicts, for the terminal, a future to-be-played advertisement related to the application information, the device information, or the user behavior data, so as to increase a promotion success rate of an advertisement.

With reference to the first aspect and the foregoing possible implementations, in another possible implementation, the second advertisement information includes a download link of the second advertisement creative; and the obtaining, by the terminal, a second advertisement creative of the future to-be-played advertisement based on the second advertisement information includes: when the terminal is in a Wi-Fi network, downloading, by the terminal, the second advertisement creative based on the download link of the second advertisement creative. This can reduce extra traffic overheads brought to the user when the terminal downloads an advertisement creative by using a mobile network.

With reference to the first aspect and the foregoing possible implementations, in another possible implementation, the first advertisement information includes a content identifier; and the obtaining, by the terminal, a first advertisement creative of the current to-be-played advertisement based on the first advertisement information includes: determining, by the terminal through searching, whether a target advertisement creative corresponding to the content identifier is stored in the terminal; and if the target advertisement creative corresponding to the content identifier is not stored, obtaining, by the terminal from the server, a first advertisement creative corresponding to the content identifier; or if the target advertisement creative corresponding to the content identifier is stored, using, by the terminal, the target advertisement creative as the first advertisement creative, and displaying the first advertisement creative on the display screen of the terminal, to complete a playback process of the current to-be-played advertisement.

In this case, in the process of playing the current to-be-played advertisement, the terminal does not need to download the first advertisement creative corresponding to the first advertisement information, so that the user does not need to spend a large amount of time waiting for downloading an advertisement creative during use of the app, thereby increasing a promotion success rate of an advertisement and improving user experience during use of the app.

With reference to the first aspect and the foregoing possible implementations, in another possible implementation, the separately displaying, by the terminal, the first advertisement creative and the second advertisement creative includes: displaying, by the terminal, the first advertisement creative at a first moment; and displaying, by the terminal, the second advertisement creative at a second moment, where the second moment is later than the first moment.

For example, the displaying, by the terminal, the second advertisement creative at a second moment includes: when third advertisement information obtained by the terminal includes a content identifier of the second advertisement creative, displaying, by the terminal, the second advertisement creative.

For another example, the displaying, by the terminal, the second advertisement creative at a second moment includes: when the second moment arrives, obtaining, by the terminal, scenario description data, where the scenario description data is used to indicate a current application scenario of the terminal; and when the scenario description data is related to the second advertisement creative, displaying, by the terminal, the second advertisement creative.

In other words, when displaying the downloaded second advertisement creative, the terminal may intelligently display, to the user based on the current application scenario, an advertisement creative related to the current application scenario. In this way, in a process of watching an advertisement by the user, time of downloading an advertisement creative can be saved, and the user is also able to watch an advertisement best matching the current application scenario, thereby increasing a promotion success rate of an advertisement and improving user experience when the user uses the app.

According to a second aspect, an embodiment of this application provides a terminal, including: an obtaining unit, configured to: obtain first advertisement information of a current to-be-played advertisement and second advertisement information of a predicted future to-be-played advertisement, where the first advertisement information is used to indicate a characteristic attribute of a to-be-played advertisement currently displayed on the terminal, and the second advertisement information is used to indicate a characteristic attribute of a to-be-played advertisement to be displayed on the terminal in the future; obtain a first advertisement creative of the current to-be-played advertisement based on the first advertisement information; and obtain a second advertisement creative of the future to-be-played advertisement based on the second advertisement information; and a display unit, configured to separately display the first advertisement creative and the second advertisement creative.

With reference to the first aspect, in a possible implementation, the terminal further includes a sending unit, and the sending unit is configured to send an advertisement request for the current to-be-played advertisement to a server, where the advertisement request is used to trigger the server to determine first advertisement information corresponding to the current to-be-played advertisement, and to predict second advertisement information corresponding to the future to-be-played advertisement; and the obtaining unit is further configured to receive a response message sent by the server, where the response message includes the first advertisement information and the second advertisement information.

With reference to the second aspect and the foregoing possible implementation, in another possible implementation, the second advertisement information includes a download link of the second advertisement creative; and the obtaining unit is specifically configured to: when the terminal is in a Wi-Fi network, download the second advertisement creative based on the download link of the second advertisement creative.

With reference to the second aspect and the foregoing possible implementations, in another possible implementation, the first advertisement information includes a content identifier; and the obtaining unit is specifically configured to: determine, through searching, whether a target advertisement creative corresponding to the content identifier is stored in the terminal; if the target advertisement creative corresponding to the content identifier is stored, use the target advertisement creative as the first advertisement creative; or if the target advertisement creative corresponding to the content identifier is not stored, obtain, from the server, a first advertisement creative corresponding to the content identifier.

With reference to the second aspect and the foregoing possible implementations, in another possible implementation, the display unit is specifically configured to display the first advertisement creative at a first moment, and display the second advertisement creative at a second moment, where the second moment is later than the first moment.

With reference to the second aspect and the foregoing possible implementation, in another possible implementation, the display unit is specifically configured to: when third advertisement information obtained by the terminal includes a content identifier of the second advertisement creative, display the second advertisement creative.

With reference to the second aspect and the foregoing possible implementation, in another possible implementation, the obtaining unit is further configured to: when the second moment arrives, obtain scenario description data, where the scenario description data is used to indicate a current application scenario of the terminal; and the display unit is specifically configured to: when the scenario description data is related to the second advertisement creative, display the second advertisement creative.

According to a third aspect, an embodiment of this application provides a terminal, including: a processor, a memory, a bus, and a communications interface; the memory is configured to store a computer-executable instruction; the processor is connected to the memory by using the bus; and when the terminal runs, the processor executes the computer-executable instruction stored in the memory, so that the terminal performs the advertisement display method according to any one of the foregoing implementations.

According to a fourth aspect, an embodiment of this application provides a computer-readable storage medium; the computer-readable storage medium stores an instruction; and when the instruction is executed on the terminal according to any one of the foregoing implementations, the terminal performs the advertisement display method according to any one of the foregoing implementations.

According to a fifth aspect, an embodiment of this application provides a computer program product including an instruction; and when the computer program product runs on the terminal according to any one of the foregoing implementations, the terminal performs the advertisement display method according to any one of the foregoing implementations.

In the embodiments of this application, names of the foregoing terminals impose no limitation on device themselves. During actual implementation, these devices may have other names. All devices with functions similar to those in the embodiments of this application fall within the scope of the claims of this application and equivalent technologies of this application.

In addition, for technical effects of any design manner in the second aspect to the fifth aspect, refer to technical effects of the different design methods in the first aspect. Details are not described herein again.

DESCRIPTION OF EMBODIMENTS

The terms "first" and "second" mentioned below are merely used for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, "plurality" means at least two, unless otherwise specified.

Figure 1:
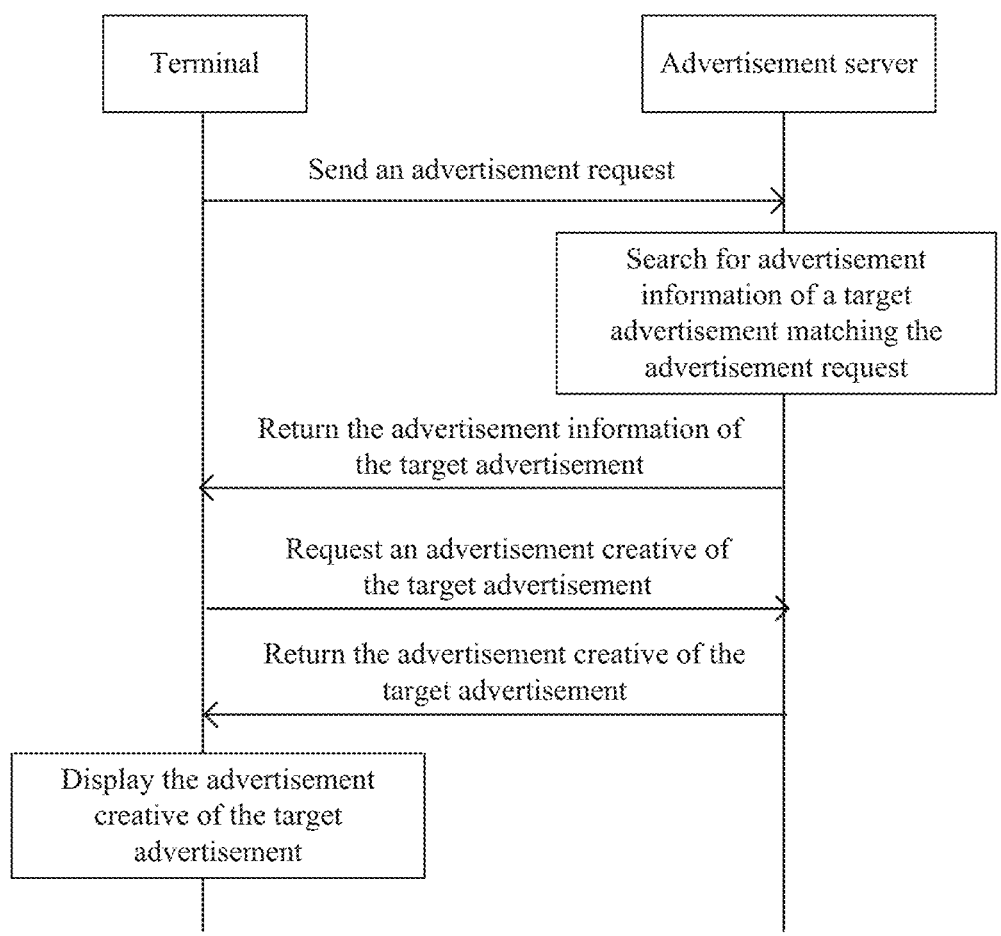
FIG. 1 is a schematic interaction diagram of an advertisement display method in the prior art.
Figure 2:
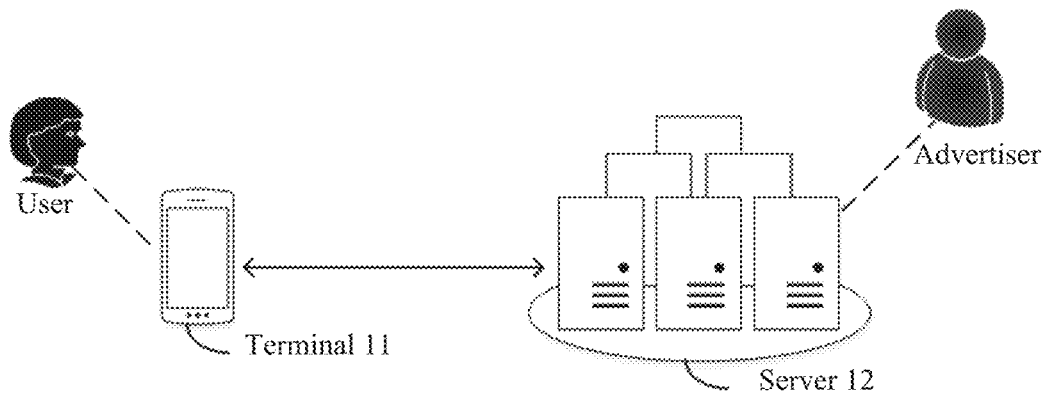
FIG. 2 is a schematic diagram 1 of an architecture of an advertising system according to an embodiment of this application.

An embodiment of this application provides an advertisement display method, and the method may be applied to an advertising system shown in FIG. 2. The system includes a terminal 11 and at least one server 12 (for example, an advertisement server).

An advertisement resource pool is maintained on the server 12. The advertisement resource pool stores advertisement creatives (for example, text, an image, a video, and audio included in an advertisement) and advertisement information (for example, an advertisement type and an advertisement creative link address) uploaded by advertisers.

In a process of running an app on the terminal 11, the terminal 11 may be triggered to request a corresponding advertisement creative from the server 12. For example, in a process in which a user watches a video by using a video application, when detecting that the user triggers a pause button, the terminal 11 may send an advertisement request to the server 12, and the server 12 returns advertisement information corresponding to the advertisement request to the terminal 11. In this case, the terminal 11 may obtain a corresponding advertisement creative from the advertisement resource pool of the server 12 based on the advertisement information, and display the obtained advertisement creative on a current video pause screen.

The advertisement information refers to a description parameter used for indicating a characteristic attribute of a to-be-played advertisement, for example, an advertisement ID and name, an advertisement type, and an advertisement creative link address. This is not limited in this embodiment of this application.

Correspondingly, the advertisement creative is specific advertisement content to be displayed on a display screen of the terminal 11, for example, text, an image, a video, and audio included in an advertisement. This is not limited in this embodiment of this application.

In this embodiment of this application, when the terminal 11 needs to display a current to-be-played advertisement on the display screen, the terminal 11 may obtain, from the server 12 at one time, advertisement information of the current to-be-played advertisement (that is, first advertisement information) and advertisement information of a future to-be-played advertisement (that is, second advertisement information) that is predicted by the server 12 and that is likely to be displayed on the terminal 11 in the future. Then, the terminal 11 may further obtain an advertisement creative of the current to-be-played advertisement (that is, a first advertisement creative) based on the first advertisement information, and display the first advertisement creative on the current display screen, to complete a display process of the current to-be-played advertisement.

In addition, the terminal 11 may further obtain an advertisement creative of the future to-be-played advertisement (that is, a second advertisement creative) based on the second advertisement information. Therefore, when the terminal 11 needs to display the future to-be-played advertisement at a future moment, the obtained second advertisement creative can be directly output to the display screen for displaying, thereby saving time of downloading the second advertisement creative from the server 12 by the terminal 11. In this way, during use of the app, the user does not need to spend a large amount of time waiting for the terminal 11 to download an advertisement creative, thereby increasing a promotion success rate of an advertisement and improving user experience during use of the app.

In specific implementation, the terminal 11 may be a desktop computer, a laptop computer, a tablet computer, a handheld computer, a mobile phone, a notebook computer, an ultra-mobile personal computer (Ultra-mobile Personal Computer, UMPC), a netbook, a cellular phone, a personal digital assistant (Personal Digital Assistant, PDA), a dedicated media renderer, a consumer electronic device, a wearable device, an AR (augmented reality)/VR (virtual reality) device, or the like.

Figure 3:
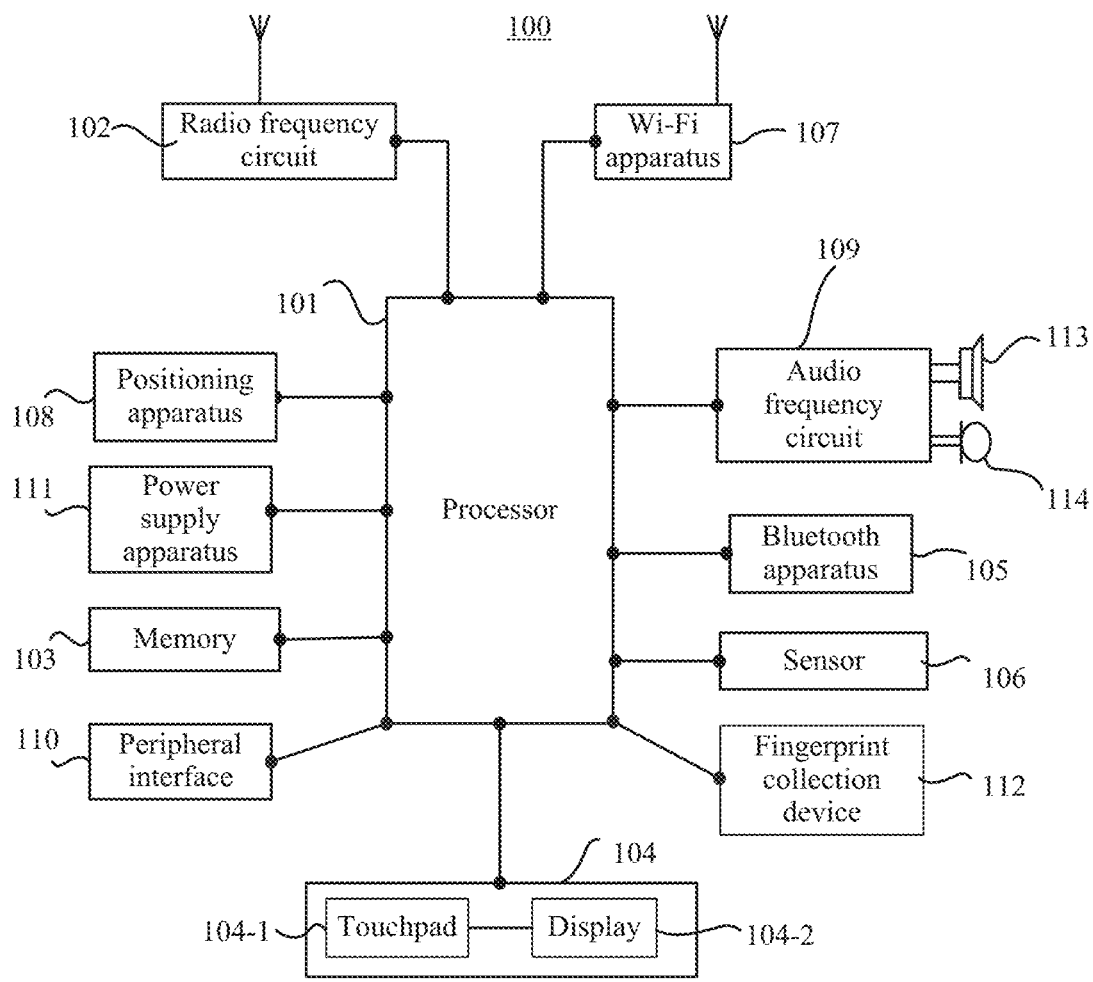
FIG. 3 is a schematic structural diagram of a mobile phone according to an embodiment of this application.

As shown in FIG. 3, in this embodiment of this application, description is provided by using an example in which the terminal 11 is a mobile phone. It should be understood that a mobile phone 100 shown in FIG. 3 is only an example of the terminal, and the mobile phone 100 may have more or fewer components than those shown in the figure, or a combination of two or more components, or components arranged in a different manner.

As shown in FIG. 3, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio frequency circuit 109, a peripheral interface 110, and a power supply system 111. These components may communicate with each other by using one or more communications buses or signal lines (which are not shown in FIG. 3). A person skilled in the art can understand that a hardware structure shown in FIG. 3 does not constitute any limitation on the mobile phone, and the mobile phone 100 may include more or fewer components than those shown in the figure, or a combination of some components, or components arranged in a different manner.

The following describes each component of the mobile phone 100 in detail with reference to FIG. 3.

The processor 101 is a control center of the mobile phone 100, and connects various parts of the mobile phone 100 by using various interfaces and lines, and runs or executes an application program (which may be referred to as app hereinafter) stored in the memory 103 and invokes data stored in the memory 103, to perform various functions of the mobile phone 100 and process data. In some embodiments, the processor 101 may include one or more processing units. For example, the processor 101 may be a Kirin 960 chip manufactured by Huawei Technologies Co., Ltd.

The radio frequency circuit 102 may be configured to receive and send a radio signal in an information receiving and sending process or a call process. Particularly, the radio frequency circuit 102 may receive downlink data from a base station and then send the downlink data to the processor 101 for processing, and also send related uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may communicate with other devices through radio communication. Any communications standard or protocol may be used for the radio communication, including but not limited to Global System for Mobile Communications, General Packet Radio Service, Code Division Multiple Access, Wideband Code Division Multiple Access, Long Term Evolution, email, short message service, and the like.

The memory 103 is configured to store an application program and data. The processor 101 executes the application program and the data stored in the memory 103, to perform various functions of the mobile phone 100 and process data. The memory 103 mainly includes a program storage area and a data storage area. The program storage area may store an operating system and an application program required by at least one function (such as an audio playback function and an image playback function). The data storage area may store data (such as audio data and a phone book) created during use of the mobile phone 100. In addition, the memory 103 may include a high-speed random access memory, and may further include a non-volatile memory such as a disk storage device, a flash memory device, or another volatile solid-state storage device. The memory 103 may store various operating systems such as an iOS operating system developed by Apple and an Android operating system developed by Google.

The touchscreen 104 may include a touchpad 104-1 and a display 104-2. The touchpad 104-1 may collect a touch event performed by a user of the mobile phone 100 on or near the touchpad (for example, an operation performed on the touchpad 104-1 or near the touchpad 104-1 by the user by using a finger, a stylus, or any other appropriate object), and send collected touch information to another component such as the processor 101. In FIG. 3, the touchpad 104-1 and the display 104-2 are used as two independent components to implement input and output functions of the mobile phone 100. However, in some embodiments, the touchpad 104-1 and the display 104-2 can be integrated to implement the input and output functions of the mobile phone 100. It can be understood that the touchscreen 104 is made of a plurality of stacked layers of materials. In this embodiment of this application, only the touchpad (layer) and the display (layer) are displayed, and other layers are not recorded in this embodiment of this application. In addition, in some other embodiments of this application, the touchpad 104-1 may cover the display 104-2, and the touchpad 104-1 is larger than the display 104-2, so that the entire display 104-2 is covered by the touchpad 104-1; or the touchpad 104-1 may be disposed on a front side of the mobile phone 100 in a full-panel form, that is, any touch performed by the user on the front side of the mobile phone 100 can be sensed by the mobile phone, so as to implement experience of full touch on the front side of the mobile phone. In some other embodiments, the touchpad 104-1 is disposed on the front side of the mobile phone 100 in the full-panel form, and the display 104-2 may also be disposed on the front side of the mobile phone 100 in the full-panel form, thereby implementing a frameless structure on the front side of the mobile phone.

In this embodiment of this application, the mobile phone 100 may further have a fingerprint recognition function. For example, a fingerprint sensor 112 may be disposed on a rear side of the mobile phone 100 (for example, below a rear-facing camera), or a fingerprint sensor 112 may be disposed on the front side of the mobile phone 100 (for example, below the touchscreen 104). For another example, a fingerprint collection device 112 may be disposed in the touchscreen 104, to implement the fingerprint recognition function, that is, the fingerprint collection device 112 may be integrated into the touchscreen 104 to implement the fingerprint recognition function of the mobile phone 100. In this case, the fingerprint collection device 112 is disposed in the touchscreen 104, and may be a part of the touchscreen 104 or may be disposed in the touchscreen 104 in another manner. A main component of the fingerprint collection device 112 in this embodiment of this application is a fingerprint sensor. The fingerprint sensor may be implemented by using any type of sensing technology, including but not limited to an optical technology, a capacitive technology, a piezoelectric technology, an ultrasonic sensing technology, or the like.

In this embodiment of this application, the mobile phone 100 may further include the Bluetooth apparatus 105, configured to implement data exchange between the mobile phone 100 and another terminal (for example, a mobile phone or a smartwatch) in a short distance from the mobile phone 100. The Bluetooth apparatus in this embodiment of this application may be an integrated circuit, a Bluetooth chip, or the like.

The Wi-Fi apparatus 107 is configured to provide, for the mobile phone 100, network access compliant with a Wi-Fi related standard and protocol. The mobile phone 100 may connect to a Wi-Fi access point by using the Wi-Fi apparatus 107, to help the user send or receive emails, view web pages, access streaming media, and the like. The Wi-Fi apparatus 107 provides wireless broadband Internet access for the user. In some other embodiments, the Wi-Fi apparatus 107 may alternatively be used as a Wi-Fi wireless access point, to provide Wi-Fi network access for another terminal.

The mobile phone 100 may further include at least one sensor 106 such as a light sensor, a motion sensor, and another sensor. Specifically, the light sensor may include an ambient light sensor and a proximity sensor. The ambient light sensor may adjust luminance of the display of the touchscreen 104 based on brightness of ambient light. The proximity sensor may turn off the display when the mobile phone 100 is moved close to an ear. As a type of motion sensor, an accelerometer sensor may detect acceleration magnitudes in all directions (usually three axes), may detect a magnitude and a direction of gravity when the accelerometer sensor is stationary, and may be configured to recognize mobile phone postures (such as landscape-portrait mode switching, related games, and magnetometer posture calibration), vibration-recognition-related functions (such as a pedometer and knock), and the like. Other sensors such as a gyroscope, a barometer, a hygrometer, a thermometer, and an infrared sensor may be further configured for the mobile phone 100. Details are not described herein.

The positioning apparatus 108 is configured to provide a geographical location for the mobile phone 100. It can be understood that the positioning apparatus 108 may be specifically a receiver of a positioning system such as a Global Positioning System (GPS), a BeiDou Navigation Satellite System, or a Russian GLONASS. After receiving a geographical location sent by the foregoing positioning system, the positioning apparatus 108 sends this information to the processor 101 for processing, or send this information to the memory 103 for saving. In some other embodiments, the positioning apparatus 108 may alternatively be a receiver of an auxiliary global positioning system (AGPS). The AGPS, acting as an auxiliary server, assists the positioning apparatus 108 in completing distance measuring and positioning services. In this case, the auxiliary positioning server communicates with the positioning apparatus 108 (that is, a GPS receiver) of the terminal such as the mobile phone 100 by using a wireless communications network, to provide positioning assistance. In some other embodiments, the positioning apparatus 108 may alternatively be based on a Wi-Fi access point positioning technology. Each Wi-Fi access point has a globally unique MAC address. When Wi-Fi is enabled on the terminal, the terminal can perform scanning and collect broadcast signals from surrounding Wi-Fi access points, so as to obtain MAC addresses broadcast by the Wi-Fi access points. The terminal sends, to a location server by using a wireless communications network, the data (for example, the MAC addresses) that can indicate the Wi-Fi access points. The location server retrieves geographical locations of all the Wi-Fi access points, calculates a geographical location of the terminal based on strength of Wi-Fi broadcast signals, and sends the geographical location to the positioning apparatus 108 of the terminal.

The audio frequency circuit 109, a loudspeaker 113, and a microphone 114 may provide an audio frequency interface between the user and the mobile phone 100. The audio frequency circuit 109 may transmit, to the loudspeaker 113, an electrical signal converted from received audio data, and the loudspeaker 113 converts the electrical signal into an audio signal for output. In addition, the microphone 114 converts a collected audio signal into an electrical signal, and the audio frequency circuit 109 receives the electrical signal and converts it into audio data, and then outputs the audio data to the RF circuit 102, so that the audio data is sent to, for example, another mobile phone, or the RF circuit 102 outputs the audio data to the memory 103 for further processing.

The peripheral interface 110 is configured to provide various interfaces to external input/output devices (such as a keyboard, a mouse, an external display, an external memory, and a subscriber identity module card). For example, a Universal Serial Bus (USB) interface is used to connect to a mouse, and metal contacts in a card slot of a subscriber identity module are used to connect to a subscriber identity module (SIM) card provided by a telecom operator. The peripheral interface 110 may be used to couple the external input/output devices to the processor 101 and the memory 103.

The mobile phone 100 may further include the power supply apparatus 111 (for example, a battery and a power supply management chip) that supplies power to the components. The battery may be logically connected to the processor 101 by using the power supply management chip, so as to implement functions such as charging management, discharging management, and power consumption management by using the power supply apparatus 111.

Although not shown in FIG. 3, the mobile phone 100 may further include a camera (a front-facing camera and/or a rear-facing camera), a flash, a miniature projection apparatus, a near field communication (NFC) apparatus, and the like. Details are not described herein.

The following describes in detail an advertisement display method provided in an embodiment of this application with reference to the accompanying drawings.

Figure 4:
FIG. 4 is a schematic diagram 1 of an application scenario of an advertisement display method according to an embodiment of this application.

In some embodiments of this application, when the terminal 11 detects that a user starts an app or a specified screen of an app is displayed, it may be considered that the terminal 11 has a request for displaying an advertisement at that time. As shown in FIG. 4, when it is detected that the user touches an icon of a player application on a screen, the terminal 11 may call an application programming interface (API) of the player application to start the player application, and the terminal 11 may further send, to the server 12, an advertisement request for requesting a current to-be-played advertisement.

Figure 5:
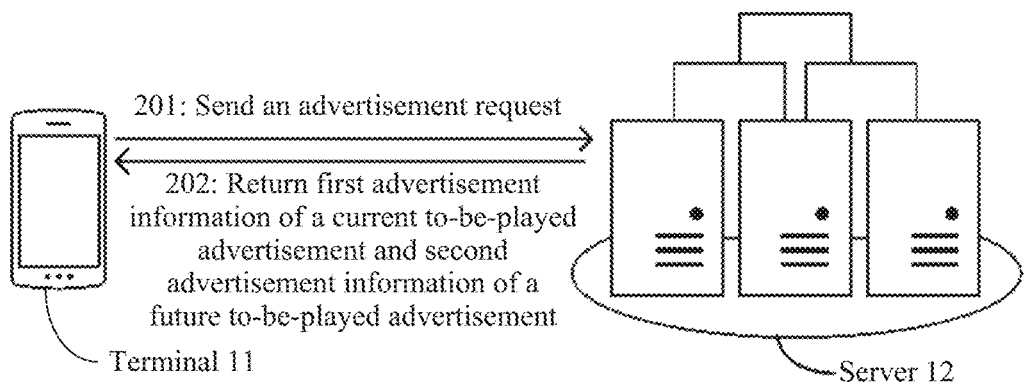
FIG. 5 is a schematic diagram 2 of an application scenario of an advertisement display method according to an embodiment of this application.

As shown in FIG. 5, the advertisement display method provided in this embodiment of this application includes the following steps 201 and 202.

201: The terminal 11 sends an advertisement request for a current to-be-played advertisement to the server 12.

202: The server 12 returns a response message of the advertisement request to the terminal 11, where the response message includes first advertisement information of the current to-be-played advertisement and second advertisement information of a future to-be-played advertisement, and the second advertisement information is information that is about the future to-be-played advertisement and that is obtained by the server 12.

In step 201, the terminal 11 may send the advertisement request to the server 12 according to a network protocol such as the Hypertext Transfer Protocol (HTTP), the HTTP Secure (HTTPS), the File Transfer Protocol (FTP), or the Secure File Transfer Protocol (SFTP).

For example, when the user starts a client A installed on the terminal 11, the client A may be triggered to call an advertisement software development kit (software development kit, SDK), to send an advertisement request in an HTTP JavaScript object notation (JavaScript Object Notation. JSON) message format to an advertisement server.

The advertisement request may carry parameters such as an application package name (pkgname) of a current app, an advertisement slot ID (slotid), and a requested-advertisement type (adtype), so that the server receiving the advertisement request can determine advertisement information matching the advertisement request.

The advertisement slot ID is used to uniquely identify a specific position, in which the current to-be-played advertisement is displayed, on the current app. The requested-advertisement type may include a plurality of types such as a banner (banner) advertisement, a splash (splash) advertisement, and a native (native) advertisement. For example, the banner advertisement type is represented by 0, the splash advertisement type is represented by 1, and the native advertisement type is represented by 2.

Further, the advertisement request may include an advertisement slot width (width) and an advertisement slot height (height). The advertisement slot width and the advertisement slot height are usually less than a width and a height of a screen of the terminal 11.

In addition, the advertisement request may further include device information of the terminal 11, for example, a device type (devicetype) of the terminal 11, an operating system version (version) of the terminal 11, a device maker (maker) of the terminal 11, a device model (model) of the terminal 11, an operating system language (language) used on the terminal 11, an international mobile equipment identity (IMEI), a mobile equipment identifier (MEID), an electronic serial number (ESN), or an Android ID (a unique identifier for an Android device) of the terminal 11, and a Media Access Control (MAC) address of the terminal 11.

For example, the advertisement request sent by the terminal 11 to the server 12 is as follows:

```
{
    "slotid":"024366ce8e1e1033ba6080fb06ade1de",//ad slot ID
    "width":1080,   //an ad slot width is 1080
    "height":1620,  //an ad slot height is 1620
    "adtype":1,    //an add type is a splash ad
    "pkgname":"com.huawei.music",  //an application package name is com.huawei.music
    "devicetype":4,  //a device type is a mobile phone
    "version":"4.4.2",  //an operating system version is 4.4.2
    "maker": "HUAWEI",  //a device maker is HUAWEI
    "model": "HUAWEI MT2-C00",//a device model is HUAWEI MT2-C00
    "language": "zh",  //an operating system language is zh (Chinese)
    "imei": "862758022496721",//an IMEI is 862758022496721
    "androidid": "8f3d82a6a2b35df3",//an androidid is 8f3d82a6a2b35df3
    "mac": "00:01:6C:06:A6:29",  //a MAC address is 00:01:6C:06:A6:29
}
```

In some embodiments of this application, the advertisement request may further include user behavior data recorded by the terminal 11, for example, a type of user favorite songs and user work and rest habits, so that the server 12 can determine, based on the advertisement request, advertisement information matching user behavior.

After receiving the advertisement request, the server 12 may compare, one by one, parameters carried in the advertisement request and advertiser-uploaded advertisement information in an advertisement resource pool, and use advertisement information satisfying the parameters in the advertisement request as the first advertisement information of the current to-be-played advertisement.

In addition, in this embodiment of this application, after the server 12 receives the advertisement request, the server 12 may further predict the future to-be-played advertisement that is likely to be displayed on the terminal 11 in the future.

In some embodiments of this application, the server 12 may predict, based on device-related device information of the terminal 11 carried in the advertisement request, the future to-be-played advertisement that is likely to be displayed on the terminal 11 in the future.

For example, a device maker carried in the foregoing advertisement request is Huawei. and therefore the server 12 may use one or more advertisements related to Huawei in the advertisement resource pool as the future to-be-played advertisement. For example, an advertisement of a new mobile phone released by Huawei is used as the future to-be-played advertisement.

In some other embodiments of this application, the server 12 may alternatively predict, based on application information that is related to a current application and that is carried in the advertisement request, the future to-be-played advertisement that is likely to be displayed on the terminal 11 in the future.

For example, an application package name carried in the advertisement request is a package name of a game app, and therefore the server 12 may use, as the future to-be-played advertisement, an advertisement of a game app, whose type is similar to that of the game app, in the advertisement resource pool.

For another example, after the user starts a video-type application A on the terminal 11, the terminal 11 is triggered to generate an advertisement request carrying a package name of the application A, and the terminal 11 sends the advertisement request to the server 12. After receiving the advertisement request, the server 12 may determine, based on the package name of the application A, that the application A is a video-type application, and the server 12 may further search the advertisement resource pool for an advertisement corresponding to the video-type application, and use the advertisement as the future to-be-played advertisement, for example, an advertisement of a current hit show. After the user starts a music-type application B on the terminal 11, the terminal 11 may be triggered to generate an advertisement request carrying a package name of the application B. and send the advertisement request to the server 12. After receiving the advertisement request, the server 12 may determine, based on the package name of the application B, that the application B is a music-type application, and the server 12 may further search the advertisement resource pool for an advertisement corresponding to the music-type application, and use the advertisement as the future to-be-played advertisement, for example, an advertisement of a headphone brand.

In some other embodiments of this application, the server 12 may alternatively predict, based on the user behavior data carried in the advertisement request, the future to-be-played advertisement that is likely to be displayed on the terminal 11 in the future.

For example, the user behavior data may be a user search record, and therefore the server 12 may determine, based on the user search record, target information that is recently concerned by the user, for example, a car, a particular brand of clothing, or a favorite food. Then, the server 12 may use an advertisement related to the target information in the advertisement resource pool as the future to-be-played advertisement.

For another example, the user behavior data may alternatively be a song playback record of the user when a music app is used, and therefore when the user starts the music app on the terminal 11, the terminal 11 may be triggered to generate an advertisement request carrying the song playback record, and the terminal 11 sends the advertisement request to the server 12. Then, after receiving the advertisement request, the server 12 may determine a user preference such as a user favorite music type and/or a favorite singer based on the carried song playback record, and the server 12 further searches the advertisement resource pool for an advertisement corresponding to the user preference as the future to-be-played advertisement, for example, an advertisement of a singer's concert.

It can be learned that in this embodiment of this application, when sending the advertisement request to the server 12, the terminal 11 may add at least one of the following information to the advertisement request: the user behavior data, the device information of the terminal 11, and the package name of the application currently triggering the advertisement request. In this way, the server 12 may determine, based on the foregoing information, a future to-be-played advertisement that is relatively highly required by the user and that has a relatively high probability of being played on the terminal 11 in the future, thereby increasing a promotion success rate of an advertisement and improving user experience when the user uses the app.

Figure 6:
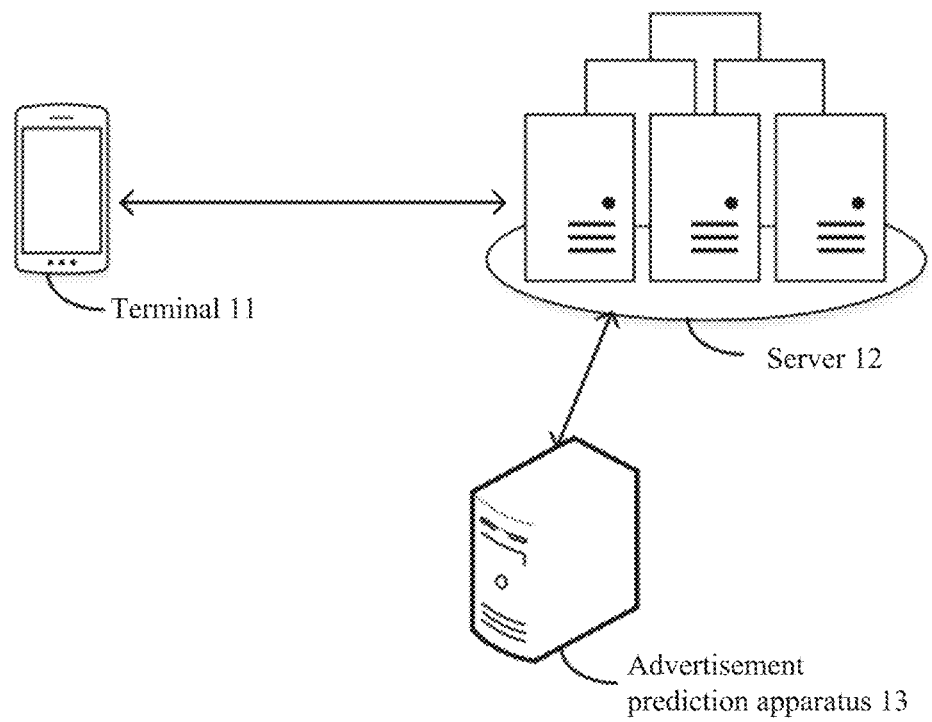
FIG. 6 is a schematic diagram 2 of an architecture of an advertising system according to an embodiment of this application.

In a possible design manner, as shown in FIG. 6, the advertising system provided in this embodiment of this application may further include an advertisement prediction apparatus 13. The advertisement prediction apparatus 13 may be connected to the server 12 in a form of an independent physical device, or may be integrated into the server 12 in a form of a functional module. This is not limited in this embodiment of this application.

After the server 12 receives the advertisement request sent by the terminal 11, the server 12 may alternatively further interact with the advertisement prediction apparatus 13, to predict the future to-be-played advertisement that is likely to be displayed on the terminal 11 in the future.

For example, the advertisement prediction apparatus 13 may pre-build, by using a big data mining tool, an advertisement prediction model based on historical advertisement data displayed on different terminals. In this case, after receiving the advertisement request sent by the terminal 11, the server 12 may send the advertisement request to the advertisement prediction model. The advertisement prediction model predicts, from the advertisement resource pool based on a related parameter carried in the advertisement request such as application information, one or more future to-be-played advertisements that are likely to be displayed on the terminal 11 in the future, and feeds back advertisement information of the predicted future to-be-played advertisement (that is, the second advertisement information) to the server 12.

In this case, in step 202, the server 12 uses, as a response message of the advertisement request, the determined first advertisement information of the current to-be-played advertisement and the second advertisement information of the predicted future to-be-played advertisement that is likely to be displayed on the terminal 11 in the future, and sends the response message to the terminal 11.

Similar to the advertisement request, the response message sent by the server 12 may also be represented in the JSON message format.

For example, the response message may include a return value (retcode) of the response message, the first advertisement information (adinfo) of the current to-be-played advertisement, and the second advertisement information (preadinfo) of the future to-be-played advertisement. If the first advertisement information or the second advertisement information matching the advertisement request is not successfully found, the response message may further include a respond failure error cause (reason).

The advertisement information (the first advertisement information and/or the second advertisement information) may include parameters such as an advertisement slot ID (slotid), an advertisement creative type (creativetype), and a content ID (contentid) of an advertisement creative corresponding to the advertisement request. The advertisement creative type may include types such as a text advertisement, an image advertisement, an image-text advertisement, and a graphics interchange format (GIF) advertisement.

Further, the advertisement information (the first advertisement information and/or the second advertisement information) may include parameters such as an advertisement creative download link (html), an advertisement creative digest value (sha256), and an advertisement interaction type (interactiontype). The advertisement interaction type may include interaction types such as no response to a user touch, opening a related web page after a user touch, downloading an application after a user touch, and entering an application after a user touch.

For example, the response message sent by the server 12 to the terminal 11 is as follows:

the future to-be-played advertisement in advance without increasing a quantity of interactions between the terminal 11 and the server 12, so that the terminal 11 can download an advertisement creative of the future to-be-played advertisement based on the advertisement information in advance, thereby saving user waiting time that is caused by real-time downloading of an advertisement creative when an advertisement needs to be played.

In addition, a lightweight database (SQLite) occupies very few resources, and a SQLite specially used for storing advertisement information may be disposed on the terminal 11. After obtaining the first advertisement information and the second advertisement information, the terminal 11 may store the first advertisement information and the second advertisement information into the SQLite, so that the terminal 11 obtains corresponding advertisement information from the SQLite subsequently, and obtains, based on the advertisement information, an advertisement creative corresponding to the advertisement information.

Figure 7:
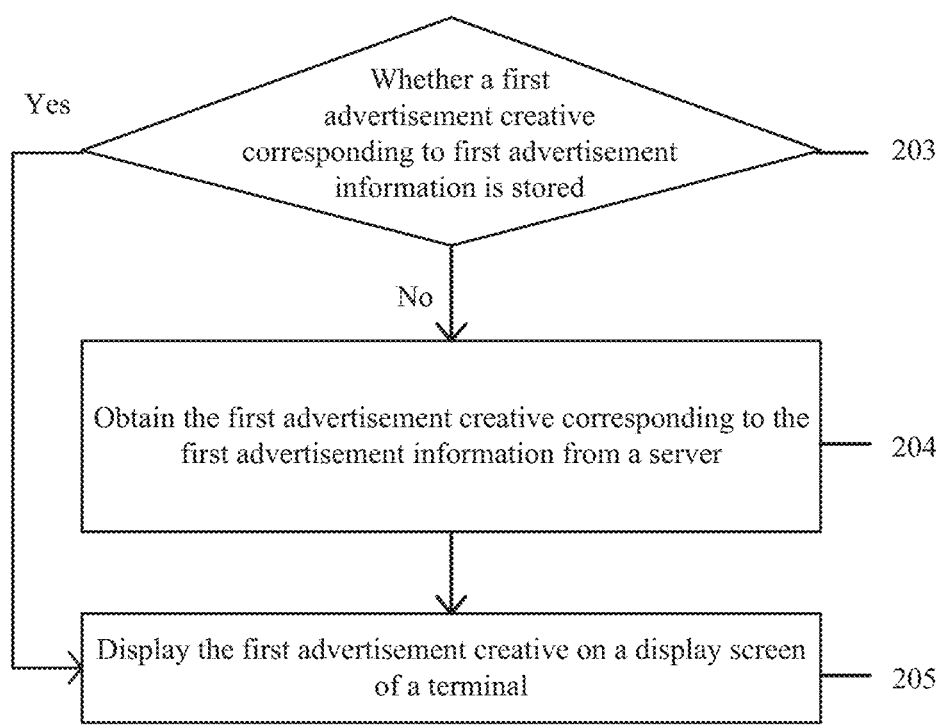
FIG. 7 is a schematic flowchart of an advertisement display method according to an embodiment of this application.

In some embodiments of this application, after the terminal 11 obtains the response message sent by the server 12, as shown in FIG. 7, the following steps 203 to 205 may be continued.

203: The terminal 11 determines whether a first advertisement creative corresponding to the first advertisement information is stored locally.

```
{
    "retcode":206,   //return value
    "adinfo": //first ad information
        {
            "slotid": "82a0da26160a1034995080fb06ade1de", //ad slot ID
            "interactiontype": 3, //an interaction type is entering an application after a user touch
            "creativetype":2, //a creative type is an image ad
            "html":"http://cs.op.hicloud.com/contserver/data/98BE13F2CD19D40.jpg", //download link
            "sha256": "45hsfrfswgh4345435" //advertisement creative digest value
        }
        "premulticontent":   //second ad information (including two pieces of ad information)
        {
            {
            "slotid": " 82a0da26160a1034995080fb06ade1de", //ad slot ID
            "interactiontype": 3, //an interaction type is entering an application after a user touch
            "creativetype":2, //a creative type is an image ad
            "html":"http://cs.op.hicloud.com/contserver/data/98B1E3F2CD1GHR4.jpg", //download link
            "sha256": "568gwe4235gdgfdh45" //advertisement creative digest value
            }
            {
            "slotid": " 82a0da26160a1034995080fb06ade1de", //ad slot ID
            "interactiontype": 3, //an interaction type is entering an application after a user touch
            "creativetype":2, //a creative type is an image ad
            "html":"http://cs.op.hicloud.com/contserver/data/345ETF89DFFw23KL.jpg", //download link
            "sha256": "1346590fdgfhj8531f" //advertisement creative digest value
            }
        }
}
```

It can be learned that, in steps 201 and 202, each time when the terminal 11 sends the advertisement request to the server 12, the server 12 determines, for the terminal 11, the first advertisement information of the current to-be-displayed advertisement suitable for being displayed currently, and also predicts, for the terminal 11, the second advertisement information of the future to-be-played advertisement that is likely to be displayed on the terminal 11. In this way, the terminal 11 can obtain the advertisement information of Specifically, the first advertisement information carries a content ID of the first advertisement creative corresponding to the first advertisement information, and therefore the terminal 11 can search locally stored advertisement creatives to determine whether a content ID same as the content ID in the first advertisement information exists.

If the content ID exists, it is determined that the first advertisement creative corresponding to the first advertisement information is stored locally, and the terminal 11 may continue to perform step 205; otherwise, it is determined that the first advertisement creative corresponding to the first advertisement information is not stored locally, and the terminal 11 may continue to perform steps 204 and 205.

204: The terminal 11 obtains the first advertisement creative corresponding to the first advertisement information from the server 12.

205: The terminal 11 displays the first advertisement creative on a display screen of the terminal 11.

Figure 8:
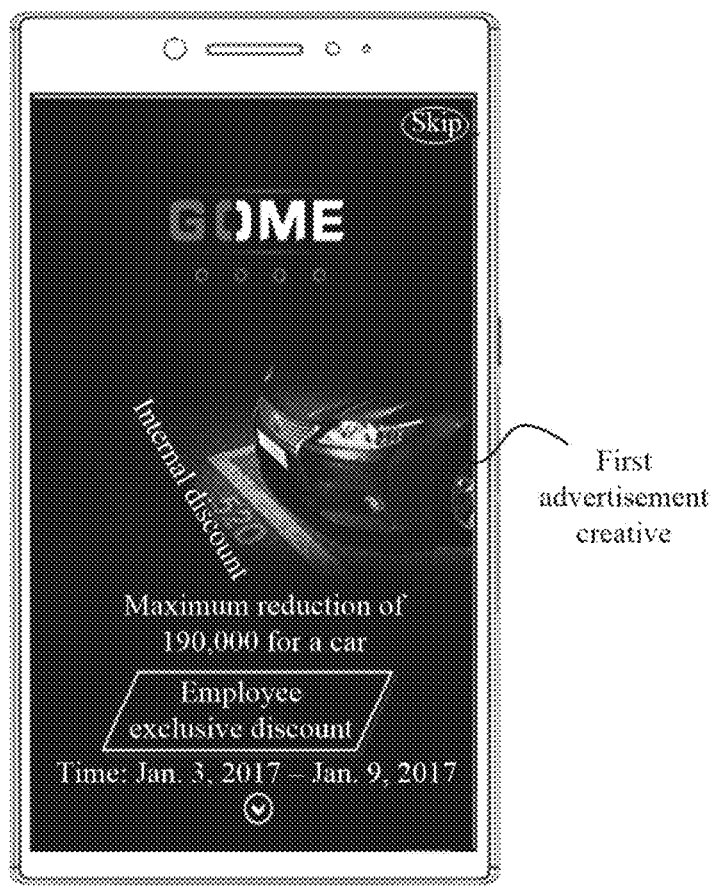
FIG. 8 is a schematic diagram 3 of an application scenario of an advertisement display method according to an embodiment of this application.

In step 204, if the first advertisement creative corresponding to the first advertisement information is not stored locally, the terminal 11 may download the first advertisement creative corresponding to the first advertisement information from the advertisement resource pool of the server 12 based on a download link carried in the first advertisement information. Further, as shown in FIG. 8, in step 205, the terminal 11 displays the first advertisement creative on the display screen of the terminal 11, to complete a playback process of the current to-be-played advertisement.

Correspondingly, if the first advertisement creative corresponding to the first advertisement information is stored locally, the terminal 11 may directly perform step 205, that is, display the first advertisement creative on the display screen of the terminal 11, to complete the playback process of the current to-be-played advertisement. In this case, in the process of playing the current to-be-played advertisement, the terminal 11 does not need to download the first advertisement creative corresponding to the first advertisement information from the advertisement resource pool, so that the user does not need to spend a large amount of time waiting for downloading an advertisement creative during use of an app, thereby increasing a promotion success rate of an advertisement and improving user experience during use of the app.

Figure 9:
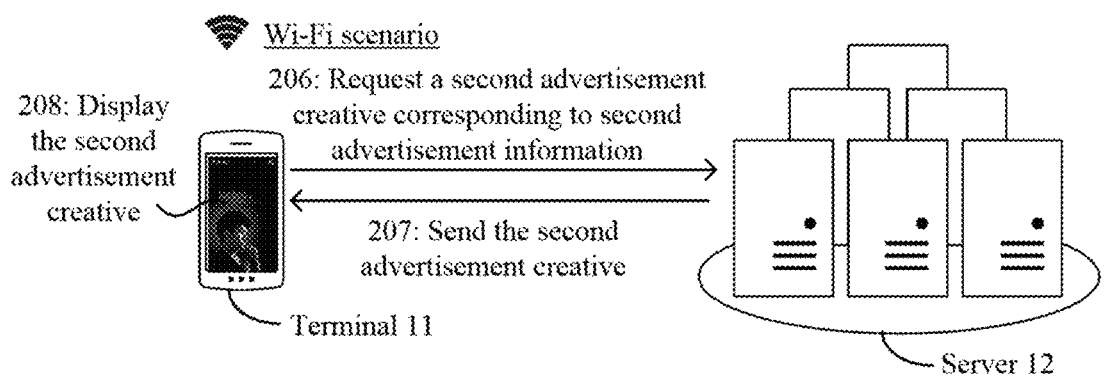
FIG. 9 is a schematic diagram 4 of an application scenario of an advertisement display method according to an embodiment of this application.

In some other embodiments of this application, after the terminal 11 obtains the response message sent by the server 12, as shown in FIG. 9, the following steps 206 to 208 may be continued.

206: The terminal 11 requests a second advertisement creative corresponding to the second advertisement information from the server 12 based on the second advertisement information.

207: The terminal 11 receives the second advertisement creative sent by the server 12.

Specifically, the second advertisement information carries a download link of the second advertisement creative corresponding to the second advertisement information, and therefore the terminal 11 may download the second advertisement creative from the advertisement resource pool of the server 12 based on the download link.

For example, when the terminal 11 is in a Wi-Fi network, the terminal 11 may be triggered to download, in the background, the second advertisement creative based on the download link in the second advertisement information. This can reduce extra traffic overheads brought to the user when the terminal 11 downloads an advertisement creative by using a mobile network.

Further, after downloading the second advertisement creative, the terminal 11 may calculate a digest value (sha256) of the second advertisement creative, and further compare the digest value obtained through calculation and the digest value of the advertisement creative carried in the second advertisement information. When the two digest values are the same, it indicates that the second advertisement creative is not tampered with during downloading. When the two digest values are different, it indicates that the second advertisement creative is tampered with during downloading. In this case, the terminal 11 may delete the downloaded second advertisement creative, and send an alarm message to the server 12, to prompt the server 12 to process the malicious tampering behavior in a timely manner.

208: The terminal 11 displays the second advertisement creative on the display screen of the terminal 11.

A first moment at which the terminal 11 displays the first advertisement creative on the display screen of the terminal 11 in step 205 is earlier than a second moment at which the terminal 11 displays the second advertisement creative on the display screen of the terminal 11 in step 208.

That is, a moment at which the terminal 11 displays the first advertisement creative is earlier than a moment at which the terminal 11 displays the second advertisement creative. For example, when a video application A is started, the terminal 11 obtains the first advertisement creative based on the obtained first advertisement information and displays the first advertisement creative on a current display screen. In a process of playing a video by using the video application A, the terminal 11 may download the second advertisement creative of the future to-be-played advertisement based on the second advertisement information. Then, when a pause operation triggered by the user is detected, the terminal 11 may display the downloaded second advertisement creative on a current pause screen. For another example, when a video application A is started, the terminal 11 may display the obtained first advertisement creative on the current display screen. In a process of running the application A, the terminal 11 may download the second advertisement creative of the future to-be-played advertisement based on the second advertisement information. Then, when an application B is started, the terminal 11 may display the downloaded second advertisement creative on the current display screen. This is not limited in this embodiment of this application.

In a possible design method, after downloading the second advertisement creative, the terminal 11 may first locally store the second advertisement creative. For example, a size of an advertisement creative is usually relatively large, and therefore the second advertisement creative may be locally stored in a form of a file, thereby improving a read speed during reading of the advertisement creative by the terminal 11.

Then, when the user re-triggers an advertisement request on the terminal 11 in the future, as described in steps 201 to 205, if advertisement information, returned by the server 12 to the terminal 11, of a current to-be-played advertisement carries a content identifier of the second advertisement creative, it indicates that the current to-be-played advertisement at that time is the second advertisement creative. Then, the terminal 11 may output the already stored second advertisement creative to the display screen of the terminal 11 for displaying.

In this way, in a process of playing the current to-be-played advertisement, the terminal 11 does not need to download the second advertisement creative from the advertisement resource pool, so that the user does not need to spend a large amount of time waiting for downloading an advertisement creative during use of an app, thereby increasing a promotion success rate of an advertisement and improving user experience during use of the app.

Figure 10:
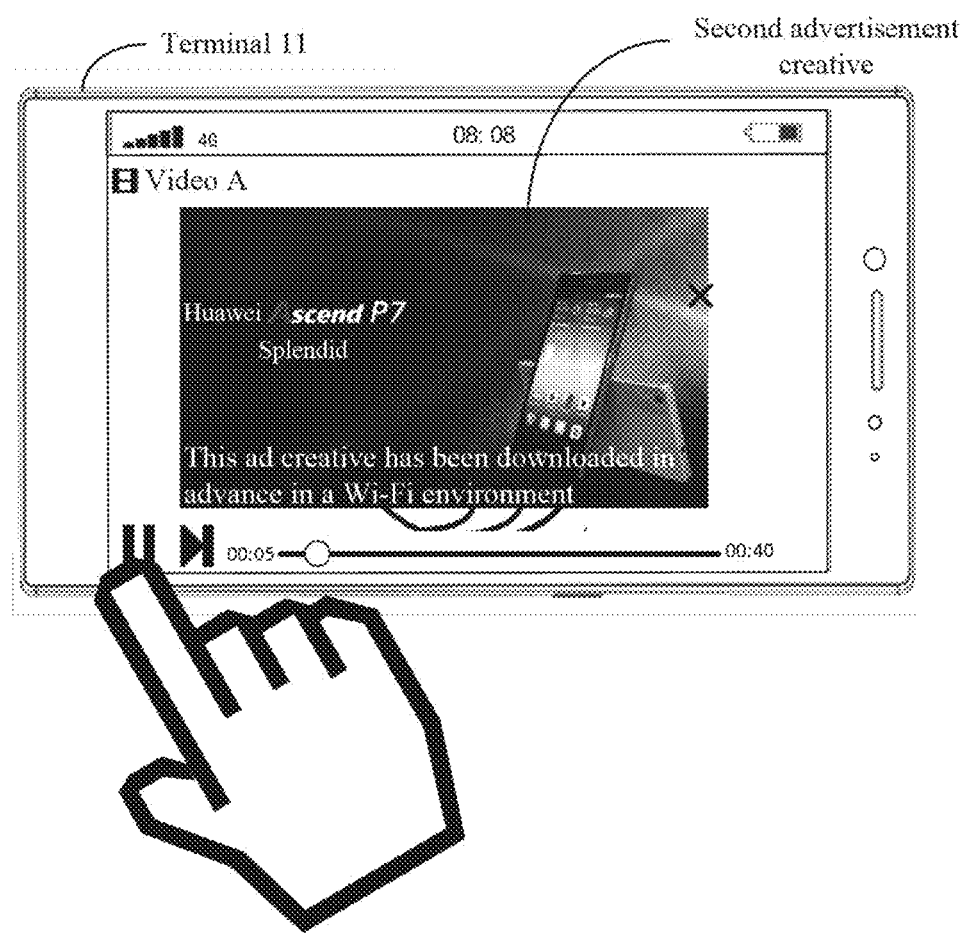
FIG. 10 is a schematic diagram 5 of an application scenario of an advertisement display method according to an embodiment of this application.

In another possible design method, after the terminal 11 downloads the second advertisement creative, the user re-triggers a request for displaying an advertisement during use of the app in the future. For example, as shown in FIG. 10, if the terminal 11 detects that the user touches a pause button when a video A is being played, the terminal 11 is triggered to display a new advertisement creative on the current display screen. In this case, the terminal 11 may output the locally stored second advertisement creative to the display screen of the terminal 11 for displaying.

For example, as shown in FIG. 10, when displaying the second advertisement creative, the terminal 11 may prompt to the user in forms such as text that the second advertisement creative currently displayed is downloaded in advance in a Wi-Fi environment. Therefore, when the second advertisement creative is displayed, the user does not need to worry about extra traffic overheads, thereby improving user experience when the user uses the video app.

In some embodiments of this application, if there is a plurality of locally stored second advertisement creatives, the terminal 11 may randomly select one of the plurality of second advertisement creatives for displaying on the current display screen.

Alternatively, the terminal 11 may further obtain scenario description data at that time, and the scenario description data is used to indicate a current application scenario of the terminal 11. In this case, the terminal 11 may select, from the plurality of second advertisement creatives, a second advertisement creative related to the scenario description data for displaying, so as to increase a promotion success rate of an advertisement.

Figure 11:
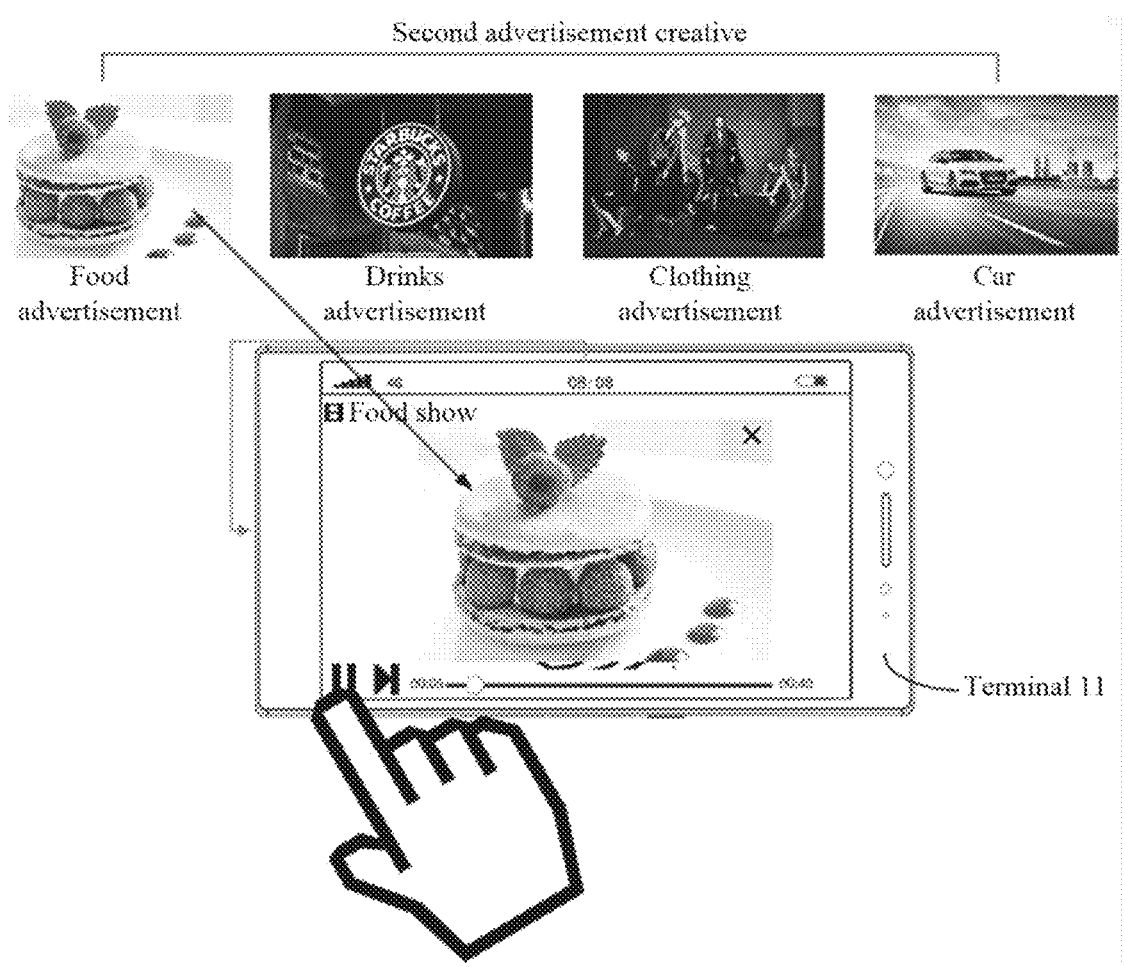
FIG. 11 is a schematic diagram 6 of an application scenario of an advertisement display method according to an embodiment of this application.

For example, the scenario description data may specifically include a type of a program currently played on an app. As shown in FIG. 11, four different types of second advertisement creatives are downloaded by the terminal in advance. When the terminal 11 plays a food show, if it is detected that the user touches the pause button, the terminal 11 is triggered to obtain the type of the program currently being played on the app, and as shown in FIG. 11, the food show is being played on the currently running video application. Then, the terminal 11 may search the prestored second advertisement creatives for an advertisement creative related to food, for example, an advertisement creative of a food advertisement in FIG. 11. The terminal 11 further displays the advertisement creative related to food on the current display screen.

Figure 12:
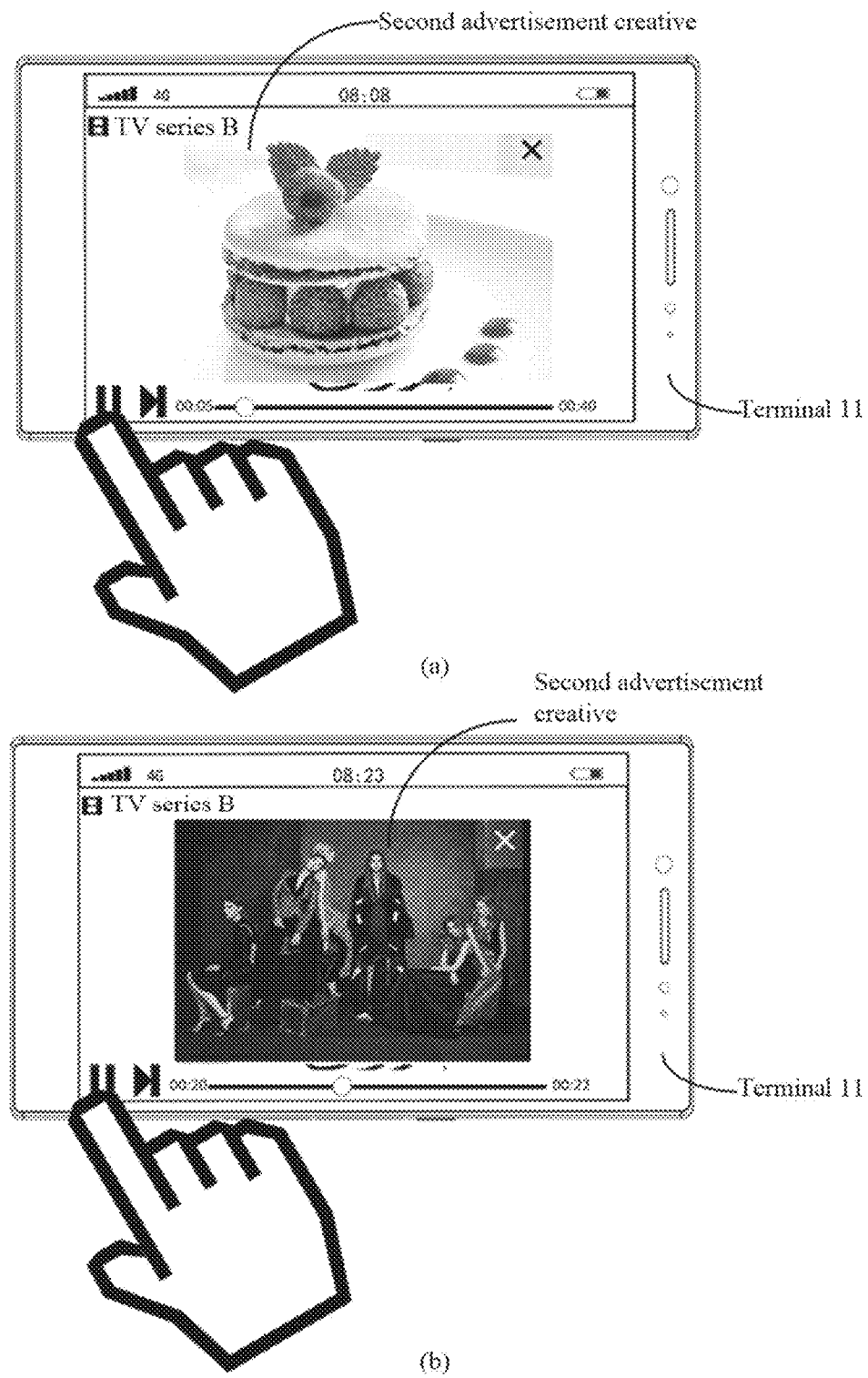
FIG. 12 is a schematic diagram 7 of an application scenario of an advertisement display method according to an embodiment of this application.

Alternatively, the scenario description data may further include screen content of the current display screen of the terminal 11. For example, the terminal 11 is playing a TV series B by using a video application, and as shown in (a) of FIG. 12, the terminal 11 detects that the user touches the pause button when the TV series B is played to a fifth minute. In this case, the terminal 11 obtains screen content of the current display screen, for example, an eating picture that is currently being played. Then, still as shown in (a) of FIG. 12, the terminal 11 may search the prestored second advertisement creatives for an advertisement creative related to food, and further display the second advertisement creative related to food on the current display screen. Afterwards, as shown in (b) of FIG. 12, the terminal 11 detects that the user touches the pause button again when the TV series B is played to a twentieth minute, and at that time, the terminal 11 is triggered again to obtain screen content of the current display screen, for example, a picture of shopping by a leading actress in the TV series that is currently being played. Then, still as shown in (b) of FIG. 12, the terminal 11 may search the prestored second advertisement creatives for an advertisement creative related to shopping, and further display the second advertisement creative related to shopping (for example, a clothing advertisement) on the current display screen.

Figure 13:
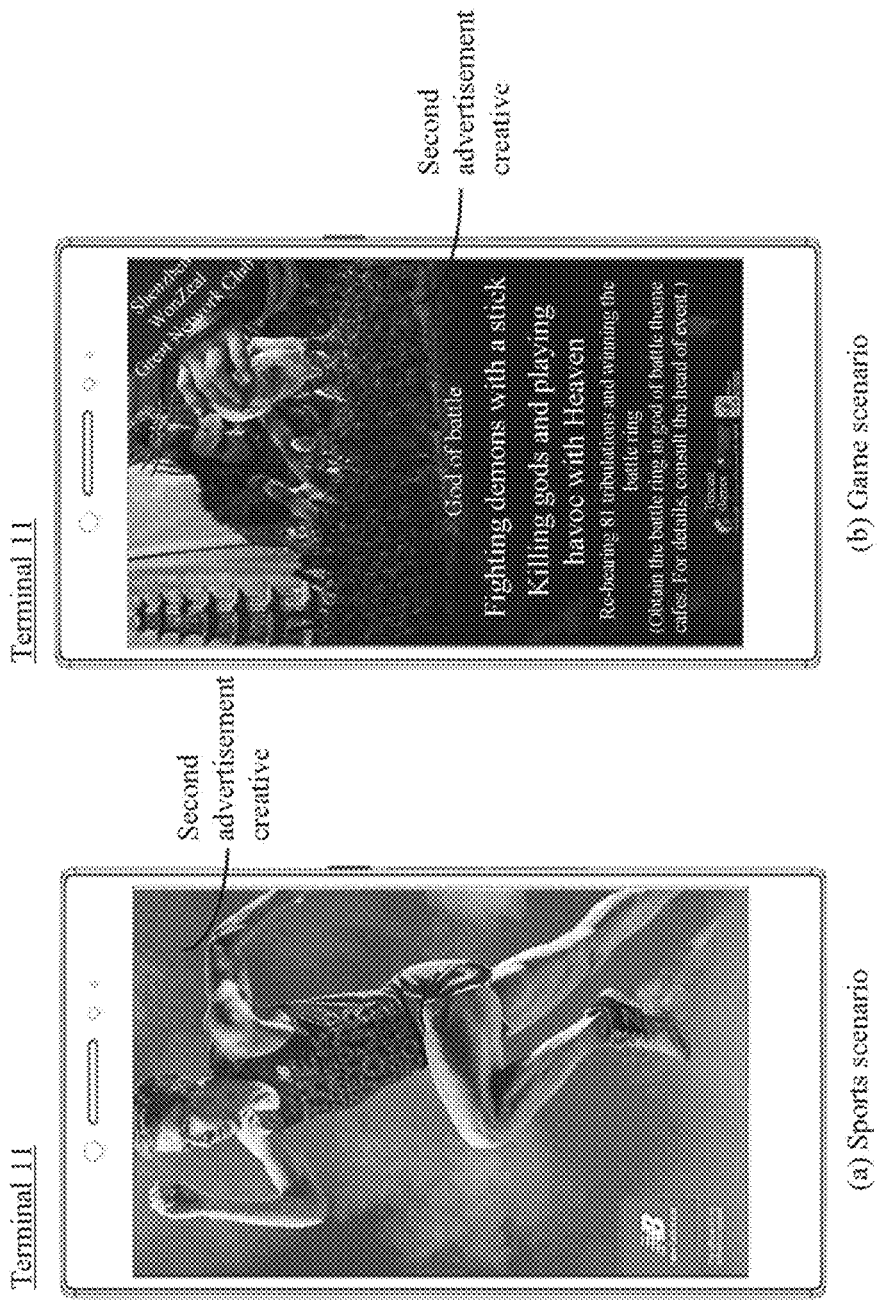
FIG. 13 is a schematic diagram 8 of an application scenario of an advertisement display method according to an embodiment of this application.

Alternatively, the scenario description data may further include information about a current application scenario of the terminal 11. For example, when it is detected that the user holds the terminal 11 while running or starts a sports-related app, it can be determined that the terminal 11 is in a sports scenario. In the sports scenario, if it is detected that the terminal 11 has a request for displaying an advertisement, as shown in (a) of FIG. 13, the terminal 11 may search the prestored second advertisement creatives for an advertisement creative related to sports, and further displays the second advertisement creative related to sports (for example, a sporting goods advertisement) on the current display screen. For another example, when it is detected that the user starts a game app, it can be determined that the terminal 11 is in a game scenario. In the game scenario, if it is detected that the terminal 11 has a request for displaying an advertisement, as shown in (b) of FIG. 13, the terminal 11 may search the prestored second advertisement creatives for an advertisement creative related to games, and further displays the second advertisement creative related to games on the current display screen.

It can be learned from the foregoing embodiment that, when displaying the downloaded second advertisement creative, the terminal 11 may intelligently display, to the user based on the current application scenario, an advertisement creative related to the current application scenario. In this way, in a process of watching an advertisement by the user, time of downloading an advertisement creative can be saved, and the user is also able to watch an advertisement best matching the current application scenario, thereby increasing a promotion success rate of an advertisement and improving user experience when the user uses the app.

It should be noted that in the foregoing embodiment, description is provided by using an example in which the server 12 adds, to the response message, the first advertisement information of the current to-be-displayed advertisement and the second advertisement information of the predicted future to-be-played advertisement that are determined for the terminal 11. It can be understood that in some other embodiments of this application, a process of predicting, by the server 12, the second advertisement information of the future to-be-played advertisement that is likely to be displayed on the terminal 11 in the future and a process of sending, by the server 12, the second advertisement information to the terminal 11 may alternatively be performed independently by the server 11.

For example, when detecting that the terminal 11 has a request for displaying an advertisement, the terminal 11 may send an advertisement request to the server 12; then, the server 12 may determine, for the terminal, only the first advertisement information of the current to-be-played advertisement corresponding to the advertisement request, so that the terminal 11 can obtain the first advertisement creative of the current to-be-played advertisement based on the first advertisement information and display the first advertisement creative. In this implementation, the terminal 11 may regularly or irregularly send, to the server 12, an extra future to-be-played advertisement request for requesting the future to-be-played advertisement; then, the server 12 that receives the future to-be-played advertisement request may further predict, for the terminal 11, the future to-be-played advertisement that is likely to be played in the future, and sends the second advertisement information of the future to-be-played advertisement to the terminal 11, so that the terminal 11 may download the advertisement creative of the future to-be-played advertisement in advance based on the second advertisement information before playing the future to-be-played advertisement. This is not limited in this embodiment of this application.

It can be understood that, to perform the foregoing functions, the terminal and the like include corresponding hardware structures and/or software modules for performing the functions. A person skilled in the art may be easily aware that units and algorithm steps of each example described in combination with the embodiments disclosed in this specification may be implemented by hardware, or a combination of hardware and computer software in the embodiments of this application. Whether a function is performed by hardware or by computer software drive hardware depends on particular applications and design constraint conditions of the technical solutions. For specific applications, a person skilled in the art may use different methods to implement the described functions; however, this implementation should not be construed as going beyond the scope of the embodiments of this application.

In the embodiments of this application, the terminal and the like may be divided into functional modules based on the foregoing method examples. For example, various functional modules corresponding to various functions may be obtained through division, or two or more functions may be integrated into one processing module. The integrated module may be implemented in a form of hardware, or may be implemented in a form of a software function module. It should be noted that the module division in the embodiments of this application is an example and is merely logical function division. There may be another division manner in actual implementation.

Figure 14:
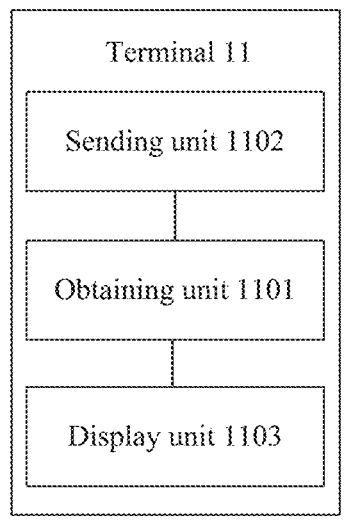
FIG. 14 is a schematic structural diagram 1 of a terminal according to an embodiment of this application.

For the division into functional modules corresponding to functions. FIG. 14 is a possible schematic structural diagram of the terminal 11 in the foregoing embodiments. The terminal 11 includes an obtaining unit 1101, a sending unit 1102, and a display unit 1103.

The obtaining unit 1101 is configured to: obtain first advertisement information of a current to-be-played advertisement and second advertisement information of a predicted future to-be-played advertisement, where the first advertisement information is used to indicate a characteristic attribute of a to-be-played advertisement currently displayed on the terminal 11, and the second advertisement information is used to indicate a characteristic attribute of a to-be-played advertisement to be displayed on the terminal 11 in the future; obtain a first advertisement creative of the current to-be-played advertisement based on the first advertisement information; and obtain a second advertisement creative of the future to-be-played advertisement based on the second advertisement information.

The display unit 1103 is configured to separately display the first advertisement creative and the second advertisement creative.

Further, the sending unit 1102 is configured to send an advertisement request for the current to-be-played advertisement to a server, where the advertisement request is used to trigger the server to determine first advertisement information corresponding to the current to-be-played advertisement, and to predict second advertisement information corresponding to the future to-be-played advertisement.

The obtaining unit 1101 is further configured to receive a response message sent by the server, where the response message includes the first advertisement information and the second advertisement information.

Further, the second advertisement information includes a download link of the second advertisement creative; and the obtaining unit 1101 is specifically configured to: when the terminal 11 is in a Wi-Fi network, download the second advertisement creative based on the download link of the second advertisement creative.

Further, the first advertisement information includes a content identifier; and the obtaining unit 1101 is specifically configured to: determine, through searching, whether a target advertisement creative corresponding to the content identifier is stored in the terminal 11; if the target advertisement creative corresponding to the content identifier is stored, use the target advertisement creative as the first advertisement creative; or if the target advertisement creative corresponding to the content identifier is not stored, obtain, from the server, a first advertisement creative corresponding to the content identifier.

Further, the display unit 1103 is specifically configured to display the first advertisement creative at a first moment, and display the second advertisement creative at a second moment. The second moment is later than the first moment.

In a possible design method, the display unit 1103 is specifically configured to: when third advertisement information obtained by the terminal 11 includes a content identifier of the second advertisement creative, display the second advertisement creative.

In another possible design method, the obtaining unit 1101 is further configured to: when the second moment arrives, obtain scenario description data, where the scenario description data is used to indicate a current application scenario of the terminal 11; and the display unit 1103 is specifically configured to: when the scenario description data is related to the second advertisement creative, display the second advertisement creative.

For function descriptions of the corresponding functional modules, refer to all related content of the steps in the foregoing method embodiments. Details are not described herein again.

Figure 15:
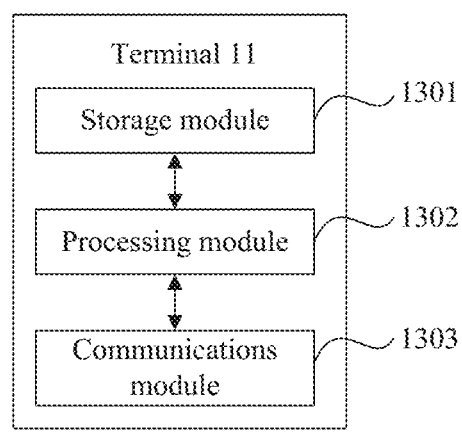
FIG. 15 is a schematic structural diagram 2 of a terminal according to an embodiment of this application.

In addition, when an integrated unit is used, FIG. 15 is a possible schematic structural diagram of the terminal 11 in the foregoing embodiments. The terminal 11 includes a processing module 1302 and a communications module 1303. The processing module 1302 is configured to perform control management on actions of the terminal 11. The communications module 1303 is configured to support communication between the terminal 11 and another network entity. The terminal 11 may further include a storage module 1301, configured to store program code and data of the terminal 11.

The processing module 1302 may be a processor or a controller, for example, a central processing unit (Central Processing Unit, CPU), a general-purpose processor, a digital signal processor (Digital Signal Processing, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 1303 may be a transceiver, a transceiver circuit, a communications interface, or the like. The storage module 1301 may be a memory.

When the processing module 1302 is a processor, the communications module 1303 is an RF transceiver circuit, and the storage module 1301 is a memory, the terminal 11 provided in this embodiment of this application may be the mobile phone 100 shown in FIG. 3.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A system comprising:
an electronic device configured to:
  play a video in an application installed in the electronic device;
  pause the video in response to a first operation of a user; and
  obtain a first image from the video when the video is paused in response to the first operation; and
a server communicatively coupled to the electronic device and configured to:
  determine a first advertisement associated with a first scenario corresponding to the first image; and
  send first advertisement information corresponding to the first advertisement to the electronic device,
wherein the electronic device is further configured to:
  receive the first advertisement information; and
  display the first advertisement while the video is paused in response to the first operation.

2. The system of claim 1, wherein the electronic device is further configured to:
resume playing the video in the application after the first advertisement is displayed;
pause the video in response to a second operation of the user; and
obtain a second image from the video when the video is paused in response to the second operation,
wherein the server is further configured to:
  determine a second advertisement associated with a second scenario corresponding to the second image, wherein the second advertisement is different than the first advertisement; and
  send second advertisement information corresponding to the second advertisement to the electronic device,
wherein the electronic device is further configured to:
  receive the second advertisement information; and
  display the second advertisement while playing the video is paused in response to the second operation.

3. The system of claim 1, wherein the first advertisement information comprises a first advertisement download link associated with the first advertisement.

4. The system of claim 3, wherein the electronic device is further configured to;
download the first advertisement from the server according to the first advertisement download link in the first advertisement information; and
store the first advertisement in the electronic device.

5. The system of claim 1, wherein the first scenario is related to food.

6. The system of claim 2, wherein the second scenario is related to clothes.

7. The system of claim 1, wherein the electronic device is further configured to launch a web page associated with the first advertisement in response to a third operation of the user on the first advertisement while the first advertisement is displayed.

8. A server, comprising:
a controller configured to:
  obtain a first image of a video when the video is paused in an electronic device in response to a first operation of a user; and
  determine a first advertisement associated with a first scenario corresponding to the first image; and
a transceiver coupled to the controller and configured to send first advertisement information corresponding to the first advertisement to the electronic device.

9. The server of claim 8, wherein the controller is further configured to:
obtain a second image from the video when the video is paused in the electronic device in response to a second operation of the user after the video is resumed; and
determine a second advertisement associated with a second scenario corresponding to the second image, wherein the second advertisement is different than the first advertisement,
wherein the transceiver is further configured to send second advertisement information corresponding to the second advertisement to the electronic device.

10. The server of claim 8, wherein the first scenario is related to food.

11. The server of claim 8, wherein the first scenario is related to clothes.

12. The server of claim 8, wherein the transceiver is further configured to send the first advertisement to the electronic device for display.

13. The server of claim 8, wherein the first advertisement information comprises a first advertisement download link associated with the first advertisement stored in the server.

14. The server of claim 8, wherein the first advertisement information comprises an interaction parameter for instructing electronic device to launch a web page associated with the first advertisement in response to a third operation of the user on the first advertisement when the first advertisement is displayed.

15. An electronic device comprising:
a processor;

a memory coupled to the processor and comprising instructions that, when executed by the processor, cause the electronic device to be configured to:
    play a video in an application installed in the electronic device;
    pause the video in response to a first operation of a user;
    obtain a first image from the video when the video is paused;
    receive first advertisement information corresponding to a first advertisement associated with a first scenario corresponding to the first image; and
    display the first advertisement while the video is paused in response to the first operation of the user.

16. The electronic device of claim 15, wherein the instructions further cause the electronic device to:
    resume the video in the application;
    pause the video in response to a second operation of the user;
    obtain a second image of from video when the video is paused;
    receive second advertisement information corresponding to a second advertisement associated with a second scenario corresponding to the second image, wherein the second advertisement is different than the first advertisement; and
    display the second advertisement while the video is paused in response to the second operation of the user.

17. The electronic device of claim 15, wherein before the first advertisement is obtained, the instructions further cause the electronic device to:
    download the first advertisement stored in a server according to a first advertisement download link in the first advertisement information; and
    store the first advertisement in the electronic device.

18. The electronic device of claim 15, wherein the instructions further cause the electronic device to perform launching of a web page associated with the first advertisement in response to a third operation of the user on the first advertisement when the first advertisement is displayed.

19. The electronic device of claim 17, wherein the first advertisement is stored in an SQLite database.

20. The electronic device of claim 15, wherein the first scenario is related to food or clothes.

\* \* \* \* \*